(12) United States Patent
Modlin

(10) Patent No.: US 6,434,190 B1
(45) Date of Patent: Aug. 13, 2002

(54) GENERALIZED PRECODER FOR THE UPSTREAM VOICEBAND MODEM CHANNEL

(75) Inventor: Cory Samuel Modlin, Chevy Chase, MD (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/574,206

(22) Filed: May 19, 2000

Related U.S. Application Data

(60) Provisional application No. 60/181,520, filed on Feb. 10, 2000.

(51) Int. Cl.[7] .......................... H04L 25/00; H04B 14/04
(52) U.S. Cl. ....................................... 375/222; 372/242
(58) Field of Search ................. 375/222, 242, 375/340, 316, 295, 219

(56) References Cited

U.S. PATENT DOCUMENTS

| | | | |
|---|---|---|---|
| 5,249,200 A | 9/1993 | Chen et al. ............... 375/58 |
| 5,388,124 A | 2/1995 | Laroia et al. ............. 375/17 |
| 5,867,529 A | 2/1999 | Cole ....................... 375/242 |
| 5,881,108 A | 3/1999 | Herzberg et al. ......... 375/296 |
| 5,949,819 A | 9/1999 | Bjarnasan et al. ....... 375/222 |
| 5,953,374 A | * | 9/1999 | Yeh ........................ 375/242 |
| 5,970,100 A | 10/1999 | Olafsson et al. ......... 375/296 |
| 5,973,725 A | 10/1999 | Lee ........................ 348/21 |
| 5,987,069 A | 11/1999 | Furukawa et al. ....... 375/285 |
| 5,995,548 A | 11/1999 | Williams et al. ......... 375/242 |
| 6,026,120 A | 2/2000 | Betts ....................... 375/261 |
| 6,034,991 A | 3/2000 | Zhou et al. .............. 375/222 |
| 6,061,392 A | 5/2000 | Bremer et al. ........... 375/222 |
| 6,061,407 A | 5/2000 | Cherubini et al. ....... 375/265 |
| 6,065,030 A | 5/2000 | Zhang ..................... 708/491 |
| 6,222,890 B1 | * | 4/2001 | Demjanenko et al. ... 375/296 |
| 6,226,334 B1 | * | 5/2001 | Olafsson ................. 375/222 |
| 6,259,742 B1 | * | 7/2001 | Olafsson et al. ......... 375/222 |
| 6,278,744 B1 | * | 8/2001 | Olafsson et al. ......... 375/296 |

* cited by examiner

Primary Examiner—Tesfaldet Bocure
(74) Attorney, Agent, or Firm—Dana L. Burton; W. James Brady; Frederick J. Telecky, Jr.

(57) ABSTRACT

For PCM upstream, the analog modem must transmit a filtered sequence of symbols so that the samples of the signal at the input to the codec at the central office (CO) are at a predetermined set of levels. This requires that the analog modem use an 8 kHz symbol rate synchronized to the CO clock. Typical telephone channels have nulls at DC and at 4 kHz. Therefore, for best performance, the signal transmitted by the analog modem should be spectrally shaped to match the channel. The present invention utilizes a generalized Laroia-Tretter-Farvardin (LTF) precoder similar to the one used in V.34. This precoder structure allows spectral shaping and could also allow for constellation shaping gains. Using this precoder structure with spectral shaping has the potential to improve data rates by 3–3.5 kbps.

8 Claims, 2 Drawing Sheets

GENERALIZED PRECODER FOR THE UPSTREAM VOICEBAND MODEM CHANNEL

CROSS-REFERENCE TO RELATED APPLICATIONS

I claim the benefit under Title 35, United States Code, § 120 to U.S. Provisional Application No. 60/181,520, filed Febr. 10, 2000, entitled PRECODER FOR V.92 PCM UPSTREAM.

STATEMENT REGARDING FEDERALLY SPONSORED RESEARCH OF DEVELOPMENT

Not applicable.

BACKGROUND OF THE INVENTION

This invention relates to upstream precoders for digital signals. More particularly, the invention relates to a precoder structure to account for nonuniform code set levels compensating for nulls in a system utilized to transmit a digital signal, allowing spectral and constellation shaping.

For V.92, it has been agreed that a "PCM upstream" scheme will be used. This means that the analog modem transmits a signal from a constellation of points that is received at the central office (CO) codec at predetermined levels. This is different than PCM downstream (as in V.90) in part because the channel and noise come before the CO codec. Unlike downstream where any sequence of levels is possible, it is not possible, given power constraints, to make arbitrary decisions about the sequence of levels that will be received by the CO codec in the upstream direction. As a simple example, it is not possible to continuously transmit the same level since the modem channel does not pass a DC component. In addition, it is not possible to do any equalization before the CO codec.

3Com, Conexant Systems, and Motorola ING have proposed using a generalized Tomlinson-Harashima (TH) precoder followed by a linear FIR equalizer in the transmitter. The combination of the precoder and linear equalizer compensate for the channel response so that the levels received by the codec match the levels transmitted.

Unlike V.34, the transmitted upstream symbols in V.92 must be at a symbol rate of 8kHz in order to match the CO codec. This is true regardless of the channel response. The channel, however, does not typically pass either a DC or a Nyquist component. From results in information theory, the spectrum of the transmitted signal should be shaped to match the channel.

Exemplary methods for communication using constellation precoding, Tomlinson precoders and trellis decoder are found in the prior art, including in U.S. Pat. No. 5,388,124 to Laroia U.S. Pat. No. 6,026,120 to Betts, U.S. Pat. No. 5,881,108 to Herzberg and U.S. Pat. No. 5,973,725 to Lee.

SUMMARY OF THE INVENTION

The Laroia-Tretter-Farvardin (LTF) precoder structure of the present invention will allow spectral shaping at the transmitter whereas a TH precoder will not. The present invention teaches that an LTF precoder can be applied to V.92 to allow spectral shaping and potential constellation shaping. The output of a TH precoder has an approximately uniform probability density function and samples are approximately independent. Its spectrum is flat regardless of the spectrum of the input sequence. The output of the LTF precoder is the original input plus a small uniformly random component. Therefore, the spectrum is largely preserved. By preserving a greater match to the original spectrum, decreased power is required because the power which is used is concentrated where the channel has the least attenuation and can pass the signal.

The preferred exemplary embodiment teaches a generalized LTF precoder for V.92 that allows non-uniform constellations, spectral shaping, and constellation shaping. The generalized LTF precoder itself is a change from proposals already considered and includes framing, trellis coding, and constellation design.

BRIEF DESCRIPTION OF THE DRAWINGS

For a better understanding of the nature of the present invention, reference is had to the following figures and detailed description, wherein like elements are accorded like reference numerals, and wherein.

DETAILED DESCRIPTION OF PREFERRED EXEMPLARY EMBODIMENTS

Figure 1:
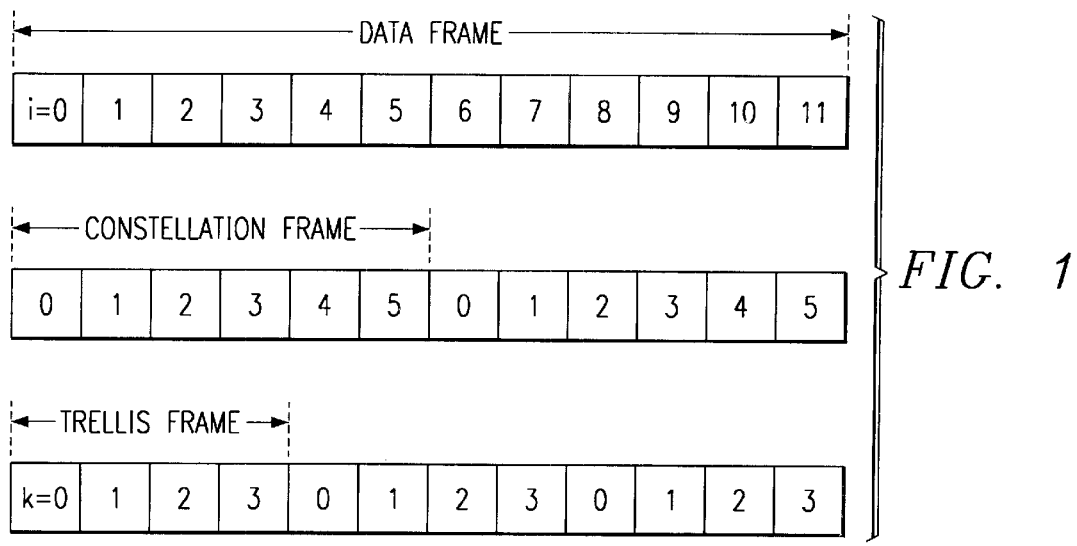
FIG. 1 is a diagram illustrating an exemplary proposed framing structure for V.92 upstream.

An exemplary framing for the data of the exemplary embodiment is illustrated in FIG. 1. This framing is used as an exemplary reference framing for description of the exemplary embodiment herein.

The framing of the present invention is based substantially on the framing described in [TR-30.1/99-11-053] (3Com et al.). The frame structure tracks the previous proposals without change. Notation is defined as follows and as found in FIG. 1. As in [TR-30.1/99-11-053], the frame of the present invention has a 12 symbol frame structure that includes 2 constellation frames of 6 symbols and 3 trellis frames of 4 symbols, as illustrated in FIG. 1.

The index i=0, 1, 2 . . . 11, indicates the data frame number. The index, k=0, 1, 2, 3, indicates the trellis frame number. There are 4 symbols in a trellis frame to match the 4 dimensional code used in V.34.

The index n as used herein, denotes time. The indices i and k can be derived from n as integer whole numbers. The index i is equal to n mod 12 or the integer remainder of n/12. The index k is equal to n mod 4 or the integer remainder of n/4.

In each 12-symbol data frame, there are K serial input data bits. K is an even number so that the data rate is any multiple of 8000/6 kbps.

K bits enter the modulus encoder. There are 12 independent mapping moduli, $M_0$ to $M_{11}$, which are the number of members in the PCM constellation points from which to choose for data frame interval 0 to data frame interval 11 respectively. $M_i$ is equal to the number of precoder output levels to be used in data frame interval i.

$K_i$ is the output of the modulus encoder for data frame i. $K_i$ is an integer determined by the input data between 0 and $M_i-1$. The method to derive $K_i$ is described in the V.90 specification and in [TR-30.1/99-11-053].

There are a number of possible ways to accomplish spectral shaping. One example is the spectral shaper in V.90. For this case, the input data bits will first need to be parsed into magnitude and sign bits. The input to the spectral shaper will use the magnitude of the indices instead of the PCM code set magnitudes to do the shaping. Simulation results show that the difference between using the PCM code set magnitudes and the constellation points as described in [TR-30.1/99-11-054]. This way, the indices are nearly linearly proportional to the code set levels.

Figure 2:
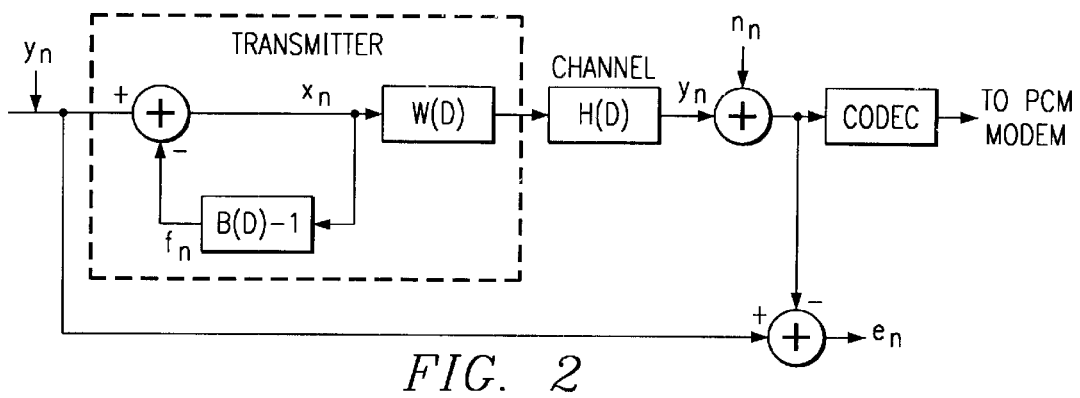
FIG. 2 is a block diagram illustrating an exemplary LTF precoder.

The precoder and pre-equalizer structure currently proposed is shown in FIG. 2. In this figure, n, indicates time. In FIG. 2, the transmitter is made of a precoder feedback element 21, B(D), and a feedforward equalizer 23, W(D). The values of $y_n$ at the input to the transmitter represent PCM code set levels. These levels are not uniformly spaced because of the nonlinear μ or A-law codec. The sequence of levels chosen is driven by the user data and the precoder rule.

The sequence, $y_n$, can not be arbitrary. In the current model, $y_n$ is chosen from an equivalence class of constellation points that, at the receiver, are all mapped to the same input value, $K_i$ (assuming that at time n, the data frame is i). The value of $y_n$ is selected from the equivalence class to minimize the power of $x_n$. For a constellation from a uniform lattice, this is equivalent to TH precoding.

The data frame number, i, continues to cycle between 0 and 11, and is equal to n mod 12. Similarly, we assume that the trellis frame number, k, cycles between 0 and 3 and is equal to n mod 4. From the index, n, we can find i and k. In generalized LTF precoding, the selection of $y_n$ is done as follows. We let the complete set of N constellation points in A be denoted by a(m), $-N/2 \leq m < N/2$ just like in [TR30.1/99-11-054]. The constellation points are in ascending order with a(-N/2) being the smallest (largest negative) point and a(N/2-1) being the largest point. Typically, A has an equal number of positive and negative elements and is symmetric around 0.

In the method of the present invention, the first step in determining $y_n$ is to find the reference point in the constellation subset. The reference point is defined as the smallest element in A larger than or equal to $f_n$ (from FIG. 2). This point is called $a(ref_n)$. With no precoder, $ref_n$ is always equal to 0.

The transmitted constellation point $y_n = a(m_n)$, is now selected based on $K_i$, the output of the modulus encoder, and $ref_n$, the reference point. The selection of the transmitted constellation point is determined by the selection of $m_n$ and is as follows:

$$m_n = K_i + ref_n - \frac{Mi}{2} \quad \text{for} \quad k = [0, 1, 2] \quad (1)$$

and for k=3(n mod 4=3), the index is selected differently depending on whether $ref_n$ is even or odd:

$$m_n = 2 \cdot K_i - M_i + ref_n + [(m_{n-3} + m_{n-2} + m_{n-1} + Y_0) \bmod 2] \text{ for } ref_n \text{ even} \quad (2)$$

$$m_n = 2 \cdot K_i - M_i + ref_n + 1 - [(m_{n-3} + m_{n-2} + m - 1 + Y_0) \bmod 2] \text{ for } ref_n \text{ odd} \quad (3)$$

Stated in words, $a(m_n)$ is selected from $a(ref_n-M_i/2) \ldots a(ref_n+M_i/2-1)$ where $a(ref_n) \ldots a(ref_n+M_i/2-1)$ corresponds to a positive precoder output and $a(ref_n-1) \ldots a(ref_n-M_i/2)$ to a negative precoder output for k=0, 1, or 2. For k=3, the interval ranges from $a(ref_n-M_i) \ldots a(ref_n+M_i-1)$. The trellis coder output $y_0$ selects one of two cosets determined by whether the sum of indices is even or odd. The four indices, $m_0 \ldots m_3$, determine the trellis coder inputs as described in [PCM'00-020, Motorola ING] (using the notation $m_n$ instead of $j_n$) through the inverse map. $Ref_n$ is a center point of a sliding window from which to select the next transmit sample.

It is possible that $m_n$ will fall outside of the range $-N/2, N/2-1$. In the usual TH or LTF precoder case, this is analogous to the situation where the channel output exceeds the codec range and clips. One way to handle this case for generalized LTF precoding is if $m_n > N/2-1$ let $m_n = M_n - M_i$ and if $m_n < -N/2$ let $m_n = m_n + M_i$.

This is analogous to having the precoder output exceeding the originally intended range. This is handled by selecting a member of the equivalence class to minimize the magnitude of the precoder output regardless of whether the precoder output remains in a specified range. In any precoding proposal, if the precoder output is allowed to exceed the originally intended range, the transmitter power level will rise; the degree of the rise will depend on the likelihood of exceeding the constellation range. The magnitude of the largest possible constellation point can be calculated as the largest possible precoder output multiplied by the L1 norm of the precoder filter. Depending on the length of the precoder filter, however, this output could be very unlikely.

This procedure describes a generalized LTF precoder. The output of the precoder maintains nearly the same spectral shape and power as the input. The input to the precoder is encoded according to a trellis code.

Figure 3:
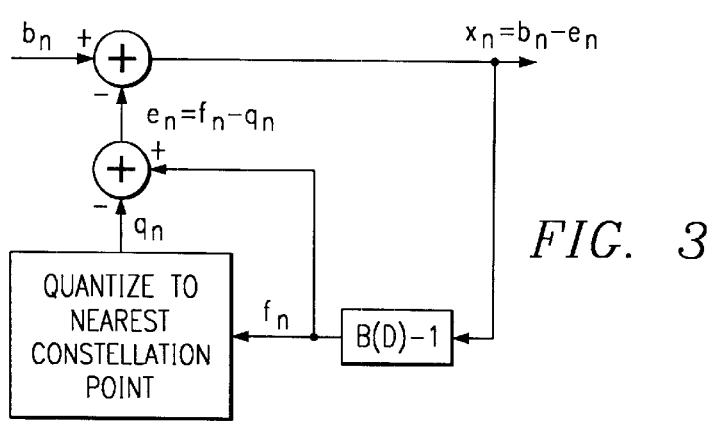
FIG. 3 is a block diagram illustrating an exemplary precoder of the present invention which matches the input to the closest constellation point.
Figure 4:
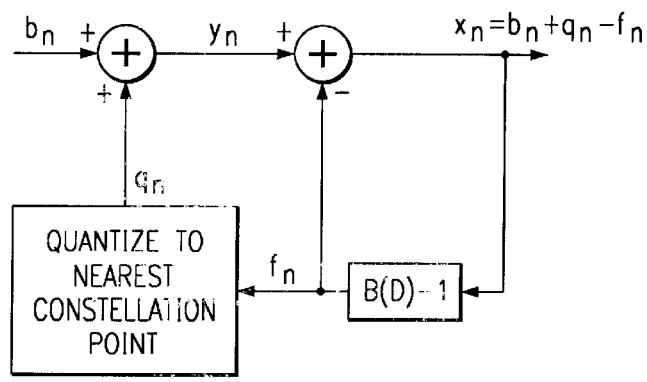
FIG. 4 is an alternative, equivalent block diagram illustrating an alternative exemplary precoder of the present invention which matches the input to the closest constellation point.
Figure 5:
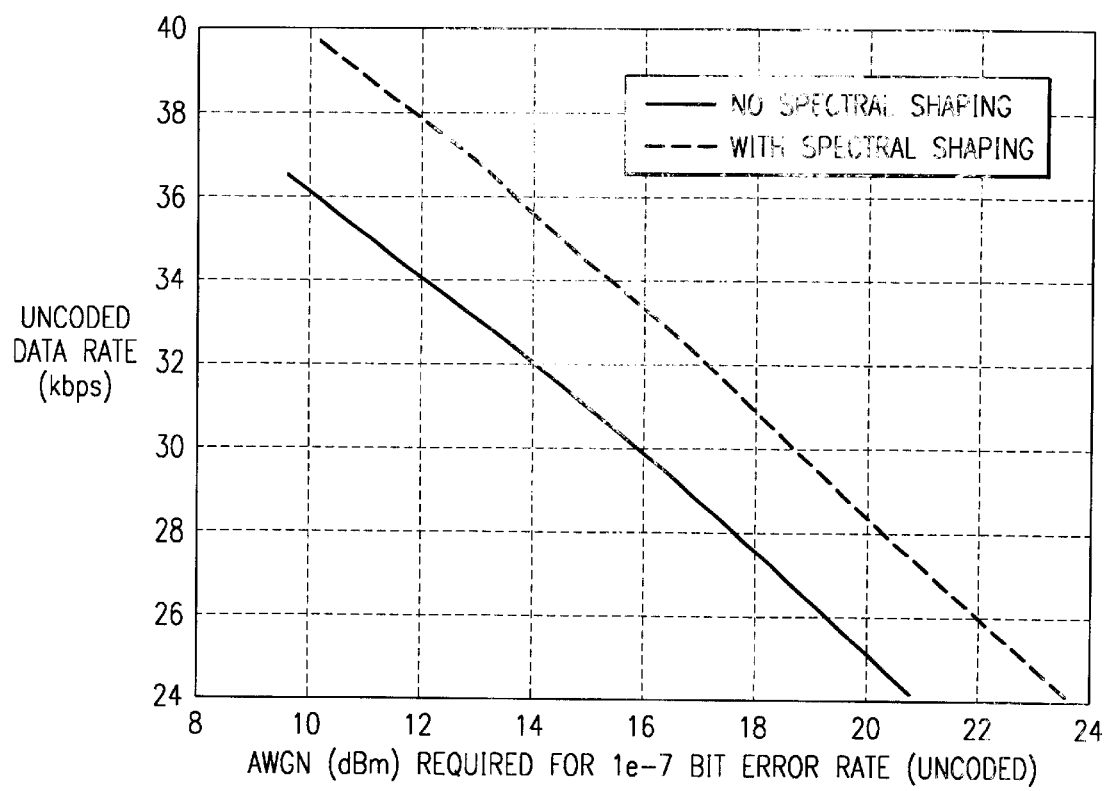
FIG. 5 is a graph illustrating the uncoded performance results illustrating the power savings of implementation of the present invention which allows greater transfer speed.

To see a parallel between the generalized LTF precoder and the version used in V.34, a block diagram of the LTF precoder used in V.34 is illustrated in FIG. 3 with an alternative embodiment illustrated in FIG. 4. In the LTF precoder, the input signal $b_n$ is not selected directly but is related to $y_n$, which is selected from equations 1 to 4 as described above. In FIG. 4, $b_n$ is equal to $y_n - q_n$. Except for the quantization error, this centers $b_n$ around the origin since $f_n$ is specified a the reference point. In the LTF precoder, the output, $x_n$, is equal to the input sequence $b_n$ plus a small term, $e_n$, that represents the error between the precoder filter output, $f_n$, and this value quantized to the nearest constellation point. When the constellation is spaced uniformly, with distance d separating constellation points, the values of $e_k$ will be uniform over the interval (-d/2, +d/2).

The average output power of the LTF precoder is identical to the average output power of the TH precoder and is equal to $(Md)^2/12$ for an M-PAM uniformly spaced constellation.

The point of this method is that $b_n$ can be spectrally shaped. Because $e_n$ is small, as is evident in FIG. 3, the output of the precoder maintains the same spectral shape. In equation 1 to 4, $b_n$ is chosen, and a quantized version of $f_n$ is added to $b_n$ to determine $Y_n$. Except for any noise or uncompensated intersymbol interference, the signal $y_n$, not $b_n$, is received at the CO codec. This is apparent in FIG. 2 and FIG. 4, since it is $y_n$ that passes through the precoder filter.

The generalized LTF precoder uses the same principles. The value of $b_n$ in FIG. 3 corresponds to $a(ref_n)$ used in the generalized precoder. The value of $b_n$ in FIG. 3 is related to $a(m_n - ref_n)$ in the generalized precoder. The difference between the V.34 precoder and the generalized LTF precoder is that the levels might not be uniform. With a uniform, infinite constellation, the two precoders would be identical.

The generalized LTF receiver is similar to the V.34 receiver but simpler. In the V.34 receiver, the first step is an equalizer filter often thought of as a linear equalizer followed by a predictor. For V.92, this filter is moved to the transmitter. For PCM upstream, a Viterbi detector operates directly on the received PCM levels and finds the most likely sequence according to the trellis encoder used. Then, as in V.34, this sequence is passed through an inverse precoder filter to recover the original input sequence.

If the input sequence, $b_n$, has the autocorrelation function, $$r_{aa} = E[b^2_n, b_n b_{n-1}, \ldots, b_n b_{n-j}] \quad (4)$$

where E(.) means "expected value of," then the autocorrelation function of $x_k$ is: $r_{xx} \approx r_{bb} + [d^2/12, 0, 0, \ldots, 0]$. For a uniformly spaced PAM constellation, $E(b_n^2)$ is equal to: $d^2/12[M^2-1]$ which is typically much larger than $d^2/12$. The output of the LTF precoder has nearly the same spectral shape as the input of the precoder.

Uncoded performance can be evaluated as the averaged probability that one of the levels in the constellation is mistaken for another level. Assuming Gaussian noise, this is equal to:

$$P \approx Q\left(\frac{d}{2\sigma}\right) \quad (5)$$

where d is the distance between two code set points and $\sigma$ is the standard deviation of the noise. For the purpose of illustration, this analysis does not include the effect of an echo received by the server. The approximation assumes that the noise is Gaussian. The noise actually consists of both additive channel noise and intersymbol interference from imperfect filtering. For a non-uniform constellation spacing, d, will vary from point to point. The performance can be approximated by assuming a uniform constellation.

For a uniform constellation, the value of d can be chosen so that the transmit power is within specified limits. From the last section, the autocorrelation of the precoder output can be written:

$$r_{xx} = \frac{(d^2 M^2)}{12}[r_{xx}] \quad (6)$$

where $r_{xx}$ is normalized. The total power out of the pre-equalizer filter is then:

$$\frac{(d^2 M^2)}{12} w^T R_{xx} w$$

where w is a column vector of pre-equalizer filter coefficients and $R_{xx}$ is a Toeplitz matrix derived from $r_{xx}$. This is the transmitter power. Given the number of PAM levels, M, the normalized autocorrelation vector $r_{xx}$, the pre-equalizer filter, w, and the power constraint, we can find d. The filters are then chosen to jointly minimize the power of the precoder output and the power of the error.

The performance estimate and the precoder and pre-equalizer filters for the generalized LTF precoder are identical to those for the generalized TH precoder if the input sequence is not spectrally shaped.

As an example, an uncoded performance on test loop 5 from PN3857 R13 (an unloaded loop) is illustrated in FIG. 4. Assuming a uniform constellation, the precoder output power was constrained to −12 dBm. An anti-aliasing filter was used with 3 dB of attenuation at 3700 Hz. The number of feedforward filter taps (symbol spaced) was set to 100 and the number of precoder taps to 40 (more than necessary). It was assumed that the precoder output had an autocorrelation vector, $r_{xx} = [1.0-0.5]$ which corresponds to the filtered output of a $1-D^2$ channel. Results shown assume that the data rate is equal to 8000 $\log_2(M)$. No code was applied and $M_i = M$ for all i. Additive noise was assumed Gaussian. The noise in dBrn is the total noise power minus 90 dBm over a 3 kHz band. Results are based on closed-form analysis.

Results show that spectral shaping does have the potential to increase data rates. Spectral shaping adds between 3 and 3.5 dB of immunity to noise. From looking at data rates, this translates to between 3 and 3.5 kbps. Depending on the spectral shaper used, there may be a code rate loss or power rate loss that would need to be taken into account.

Because many varying and different embodiments may be made within the scope of the inventive concept herein taught, and because many modifications may be made in the embodiments herein detailed in accordance with the descriptive requirements of the law, it is to be understood that the details herein are to be interpreted as illustrative and not in a limiting sense.

I claim:

1. A method for PCM upstream encoding, comprising the steps of:
   receiving a signal having a spectral shape from an analog modem;
   providing a constellation of points shaped with non-uniform probability density matched to the input spectrum of said received signal;
   providing an output signal of points from said constellation of points, closely corresponding to said spectral shape of said received signal;
   defining a pointer into said constellation of points based upon the present value of said received signal;
   defining a window of constellation points within a predetermined range based upon said pointer value; and
   selecting constellation point from within said window corresponding to said present value of said received signal.

2. The method of claim 1, wherein said points in said constellation are assigned to equivalence classes based upon said definition of said window.

3. A method for PCM upstream encoding, comprising:
   receiving a signal having a spectral shape from an analog modem;
   providing a constellation of points shaped with non-uniform probability density matched to the input spectrum of said received signal;
   providing an output signal of points from said constellation of points, closely corresponding to said spectral shape of said received signal, wherein:
   the transmitted constellation point $y_n = a(m_n)$, is determined by the selection of $m_n$ as follows:

$$m_n = K_i + refn - \frac{M_i}{2} \text{ for } k = [0, 1, 2].$$

4. A method for PCM upstream encoding, comprising:
   providing a spectral shaper for receiving a signal of input data bits and having a precoder and a pre-equalizer;
   providing a transmitter for accepting PCM code set levels from said spectral shaper and having a feedback element for producing a feedback signal and a feed forward element; wherein said PCM code set level having a symbol frame structure, including constellation frames and trellis frames;

parsing the data bits into magnitude and sign, and inputting said parsed data bits to said spectral shaper to shape said signal based on said magnitude;

choosing said PCM code set levels from a sliding window of constellation points to minimize the power;

determining a reference point in said constellation, as the smallest element in the window larger than said feedback signal;

determining the transmitted constellation point based on said reference point and said feedback signal;

determining the sum of the indices of said trellis encoded signal, selecting the trellis coder output from one of two cosets determined by the value of the sum of indices as even or odd; and providing said transmitted constellation point to said feed forward element.

5. The method of claim 4, wherein:

said transmitted constellation point is selected based on the output of said modulus encoder, and said reference point.

6. The method of claim 5, wherein:

said selection of said transmitted constellation point $y_n = a(m_n)$, is determined by the selection of $m_n$ as follows:

$$m_n = K_i + refn - \frac{M_i}{2} \text{ for } k = [0, 1, 2].$$

7. The method of claim 6, wherein when k=3, said index is selected from one of the following equations, depending on whether $ref_n$ is even or odd:

$$m_n = 2 \cdot K_i - M_i + ref_n + [(m_{n-3} + m_{n-2} + m_{n-1} + Y_0) \bmod 2] \text{ for } ref_n \text{ even}$$

$$m_n = 2 \cdot K_i - M_i + ref_n + 1 - [(m_{n-3} + m_{n-2} + m_{n-1} + Y_0) \bmod 2] \text{ for } ref_n \text{ odd}$$

8. An encoder for PCM upstream encoding, comprising:

a spectral shaper for receiving a signal of input data bits and having a precoder and a pre-equalizer;

a transmitter for accepting PCM code set levels from said spectral shaper and having a feedback element for producing a feedback signal; wherein said PCM code set level having a symbol frame structure, including constellation frames and trellis frames;

the data bits are parsed into magnitude and sign, and input to said spectral shaper to shape said signal based on said magnitude;

said PCM code set levels are chosen from a sliding window of constellation points to minimize the power;

a selector for determining a reference point in said constellation, as the smallest element in the window larger than said feedback signal;

a comparator for determining the transmitted constellation point based on said reference point and said feedback signal;

a summer for determining the sum of the indices of said trellis encoded signal, selecting the trellis coder output from one of two cosets determined by the value of the sum of indices as even or odd; and a feed forward element for receiving said transmitted constellation point.

* * * * *